(12) United States Patent
Murakami et al.

(10) Patent No.: US 8,223,856 B2
(45) Date of Patent: Jul. 17, 2012

(54) RADIO COMMUNICATION SYSTEM CARRYING OUT TRANSMISSION AND RECEPTION OF MULTICARRIER SIGNAL, TRANSMISSION TERMINAL, AND RECEPTION TERMINAL

(75) Inventors: Takashi Murakami, Kyoto (JP); Keitaro Ado, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1001 days.

(21) Appl. No.: 12/187,669

(22) Filed: Aug. 7, 2008

(65) Prior Publication Data

US 2009/0040953 A1 Feb. 12, 2009

(30) Foreign Application Priority Data

Aug. 8, 2007 (JP) ................................. 2007-206317
Aug. 8, 2007 (JP) ................................. 2007-206397

(51) Int. Cl.
 *H04K 1/10* (2006.01)
 *H04L 27/28* (2006.01)
(52) U.S. Cl. .......................... 375/260; 375/219; 375/295
(58) Field of Classification Search .................. 375/260, 375/219, 295
 See application file for complete search history.

(56) References Cited

U.S. PATENT DOCUMENTS

| 2004/0109419 A1* | 6/2004 | Sano et al. ..................... 370/320 |
| 2006/0062320 A1* | 3/2006 | Luz et al. ...................... 375/269 |

FOREIGN PATENT DOCUMENTS

| JP | 2002-261726 | 9/2002 |
| JP | 2003-283457 | 10/2003 |
| JP | 2004-088268 | 3/2004 |
| JP | 2006-333046 | 12/2006 |
| JP | 2008-259065 | 10/2008 |
| WO | WO 2005/101669 | 10/2005 |

OTHER PUBLICATIONS

Y. Tsue, "A study on inserting duration of long preamble on OFDM system in Rayleigh fading," Proceedings of Nat'l Conf. of IEICE, B-5-92, p. 445 (Mar. 8, 2006).
K. Ueda, "A study on inserting duration of long preamble on STBC-OFDM system in Rayleigh fading," Technical Report of IEICE, vol. 104, No. 595, RCS2004-270, pp. 67-70 (Jan. 20, 2005).
S. Nomura et al, "A study on frequency diversity in OFDM system," Proceedings of Nat'l Conf. of IEICE, p. 391 (Mar. 7, 2000).
T. Seki et al, "Application of frequency diversity to an OFDM system," Transactions of IEICE, B vol. J83-B, No. 10, pp. 1381-1393 (Oct. 25, 2000).
H. Yoshida et al., "Preliminary study on performance evaluation of PFDM transmission using error correction and frequency diversity," Technical Report of IEICE, vol. 102, No. 748, pp. 199-204 (Mar. 20, 2003).
Communication from the Japanese Patent Office in Appln. No. 2007-206317, dated Oct. 11, 2011.
Communication from the Japanese Patent Office in Appln. No. 2007-206397, dated Oct. 11, 2011.

* cited by examiner

*Primary Examiner* — Ted Wang
(74) *Attorney, Agent, or Firm* — Fish & Richardson P.C.

(57) ABSTRACT

A radio communication system includes a transmission terminal and a reception terminal. The transmission terminal divides and outputs transmission data, modulates the output data to a plurality of subcarriers, converts the modulated data to a temporal waveform of a multicarrier signal, and copies divided transmission data a predetermined number of times such that the number of divided transmission data, subsequent to being copied the predetermined number of times, is equal to the number corresponding to the plurality of subcarriers.

8 Claims, 4 Drawing Sheets

RADIO COMMUNICATION SYSTEM CARRYING OUT TRANSMISSION AND RECEPTION OF MULTICARRIER SIGNAL, TRANSMISSION TERMINAL, AND RECEPTION TERMINAL

BACKGROUND OF THE INVENTION

1. Field of the Invention

The present invention relates to radio communication systems, particularly a radio communication system that carries out transmission and reception of multicarrier signals, a transmission terminal, and a reception terminal.

2. Description of the Background Art

In the field of radio communication systems, various studies have conventionally been made about the reliability of transmitted and received data.

For example, Japanese Patent Laying-Open No. 2004-088268 discloses, in order to improve the error rate of reception data with respect to signals that are transmitted again (retransmission signal) from the sender side when transfer error is detected at the receiver side in an OFDM (Orthogonal Frequency-Division Multiplexing)-CDMA (Code Division Multiple Access) communication scheme, the technique of increasing the number of spread codes to be allocated to retransmission signals as the retransmission count increases.

With the widespread use of various portable communication devices including cellular phones, it is now increasingly critical to improve the reliability of data transmitted and received in a radio communication system.

SUMMARY OF THE INVENTION

In view of the foregoing, an object of the present invention is to improve the reliability of data transmitted and received in a radio communication system.

According to an aspect of the present invention, a radio communication system includes a transmission terminal transmitting transmission data identified as data to be transmitted, and a reception terminal receiving data transmitted by the transmission terminal. The transmission terminal includes an output unit dividing transmission data for output, a modulation unit modulating the data output from the output unit to a plurality of subcarriers, and a conversion unit converting the data modulated by the modulation unit to a temporal waveform of a multicarrier signal. The output unit divides the transmission data and copies the divided transmission data a predetermined number of times for output to the modulation unit such that the number of divided transmission data, subsequent to being copied the predetermined number of times, is equal to a number corresponding to a plurality of subcarriers.

According to an aspect of the present invention, a transmission terminal for transmitting transmission data identified as data to be transmitted includes an output unit dividing transmission data for output, a modulation unit modulating the data output from the output unit to a plurality of subcarriers, and a conversion unit converting the data modulated by the modulation unit to a temporal waveform of a multicarrier signal. The modulation unit adds a long training signal to each subcarrier a plurality of times. The conversion unit combines a pilot signal to the data modulated by the modulation unit to generate the multicarrier signal. The output unit divides the transmission data and copies the divided transmission data a predetermined number of times for output to the modulation unit such that the number of the divided transmission data, subsequent to being copied the predetermined number of times, is equal to a value of the number of the plurality of subcarriers minus the number of pilot signals combined to one multicarrier signal. A radio communication system including the transmission terminal also is disclosed.

A transmission terminal according to an aspect of the present invention transmits transmission data identified as data to be transmitted. The transmission terminal includes an output unit dividing transmission data for output, a modulation unit modulating the data output from the output unit to a plurality of subcarriers, and a conversion unit converting the data modulated by the modulation unit to a temporal waveform of a multicarrier signal. The output unit divides the transmission data and copies the divided transmission data a predetermined number of times for output to the modulation unit such that the number of divided transmission data, subsequent to being copied the predetermined number of times, is equal to the number corresponding to the plurality of subcarriers.

A reception terminal according to an aspect of the present invention receives data transmitted from a transmission terminal that transmits a multicarrier signal generated by modulating, by a plurality of subcarriers, divided transmission data, subsequent to being copied the predetermined number of times. The reception terminal includes a separation unit separating received data for every subcarrier, a demodulation unit demodulating data of every subcarrier separated by the separation unit, an average calculation unit calculating, for data of every subcarrier demodulated by the demodulation unit, an average of each set of data of the same copy original from the copy by the output unit, and an integration unit integrating the averages for data of the same copy original from the copy by the output unit, calculated by the average calculation unit.

According to another aspect of the present invention, a radio communication system includes a transmission terminal transmitting transmission data identified as data to be transmitted, and a reception terminal receiving data transmitted by the transmission terminal. The transmission terminal includes an output unit dividing transmission data for output, a modulation unit modulating the data output from the output unit to a plurality of subcarrier, and a conversion unit converting the data modulated by the modulation unit to a temporal waveform of a multicarrier signal. The modulation unit adds a long training signal to each subcarrier a plurality of times.

A transmission terminal according to another aspect of the present invention transmits transmission data identified as data to be transmitted. The transmission terminal includes an output unit dividing transmission data for output, a modulation unit modulating the data output from the output unit to a plurality of subcarriers, and a conversion unit converting the data modulated by the modulation unit to a temporal waveform of a multicarrier signal. The modulation unit adds a long training signal to each subcarrier a plurality of times.

At the transmission terminal of the present invention, transmission data is divided by a plurality of subcarriers for every plurality of times, each divided transmission data is copied a predetermined number of times, and then modulated by a plurality of subcarriers to generate a multicarrier signal, which is transmitted from the transmission terminal to the reception terminal.

Since the same data is transmitted by a plurality of subcarriers to the reception terminal, the reception terminal can demodulate each data in a manner of improved reliability by, for example, taking the average of the same data transmitted by a plurality of subcarriers.

Therefore, the reliability of transmitted and received data can be improved in a radio communication system.

When data is modulated by a plurality of subcarriers at the transmission terminal in the present invention, a long training signal is added a plurality of times to each subcarrier.

Therefore, the frequency phase error during data transmission can be reliably adjusted at the reception terminal.

Thus, the reliability of transmitted and received data can be improved in a radio communication system.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of a radio communication network of the present invention will be described hereinafter with reference to the drawings.

The radio communication network of the present embodiment is directed to communication under the OFDM scheme.

Figure 1:
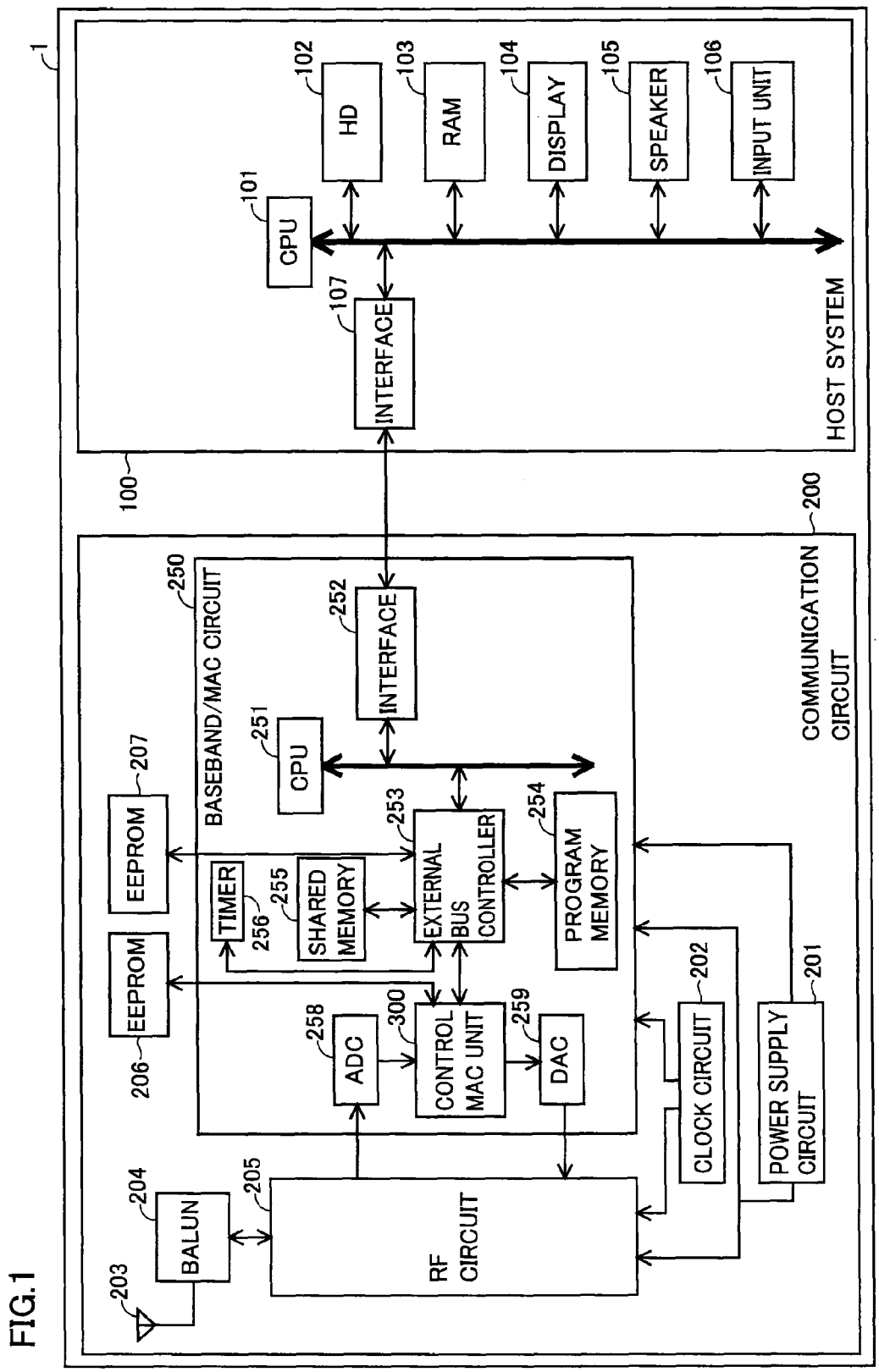
FIG. 1 schematically shows a hardware configuration of a terminal that carries out data transmission on a radio communication network according to an embodiment of the present invention.

Referring to FIG. 1, a terminal 1 mainly includes a host system 100 that carries out execution of an application and the like, and a communication circuit 200 that transmits and receives data and the like used in the application.

Host system 100 includes a CPU (Central Processing Unit) that provides overall control of the operation of host system 100.

The program of each application executed by host system 100 is stored in an HD (hard disk) 102. Host system 100 includes an RAM (Random Access Memory) 103 qualified as a work area of CPU 101, a display 104 to provide a display of information, a speaker 105 to output sound, an input unit 106 employed for entry of information such as a key and/or button, and an interface 107 for transfer of information (data) with respect to communication circuit 200.

Communication circuit 200 includes a baseband/MAC circuit 250, an RF (Radio Frequency) circuit 205, a balun 204, an antenna 203, EEPROMs (Electronically Erasable and Programmable Read Only Memory) 206 and 207, a power supply circuit 201, and a clock circuit 202.

Clock circuit 202 supplies a clock signal to baseband/MAC circuit 250 and RF circuit 205. Power supply circuit 201 controls the supply of power to baseband/MAC circuit 250 and RF circuit 205.

RF circuit 205 transmits and receives data via antenna 203. Balun 204 is provided between antenna 203 and RF circuit 205.

Baseband/MAC circuit 250 includes a CPU 251, an interface 252, an external bus controller 253, a program memory 254, a shared memory 255, a timer 256, a control MAC unit 300, an ADC (analog-digital converter) 258, and a DAC (digital-analog converter) 259.

Interface 252 is directed to host system 100.

Upon receiving an instruction to transmit data onto the network from host system 100, CPU 251 causes interface 252 to take out relevant data stored in a memory (for example, RAM 103) in host system 100. Host system 100 transmits, after generating data to instruct transmission and storing the relevant data in the aforementioned memory, a transmission instruction of the relevant data to communication circuit 200. The data output by interface 252 is temporarily stored in program memory 254 as data constituting "user data body" of the frame that is to be transmitted onto the network.

CPU 251 generates a frame that is to be transmitted onto the network by adding various data including a MAC header and a FCS (Frame Check Sequence) to the data stored in program memory 254. CPU 251 stores the generated frame in program memory 254, and sets up a flag in shared memory 255 indicating that the frame has been generated.

The operation in receiving data transmitted via the network at communication circuit 200 will be described hereinafter. The frame transmitted to RF circuit 205 via antenna 203 and balun 204 is converted into digital data at ADC 258, and then delivered to control MAC unit 300. Control MAC unit 300 carries out, on the frame converted into digital signals, detection of the frame beginning, synchronous processing of time and frequency, and then error correction decoding. Control MAC unit 300 also determines whether the transmission address (DA) of the relevant frame matches the MAC address of the relevant communication circuit 200 stored in EEPROM 206. When determination is made of a match, control MAC unit 300 removes the MAC header and FCS from the frame, and transfers the remaining data (frame body) to program memory 254. When determination is made of a mismatch, control MAC unit 300 discards the received frame.

When the received frame body is stored in program memory 254, control MAC unit 300 sets a flag indicating such information in shared memory 255. CPU 251 responds to the setting of this flag to transmit frame body region 320 stored in program memory 254 to host system 100 via interface 252.

Figure 2:
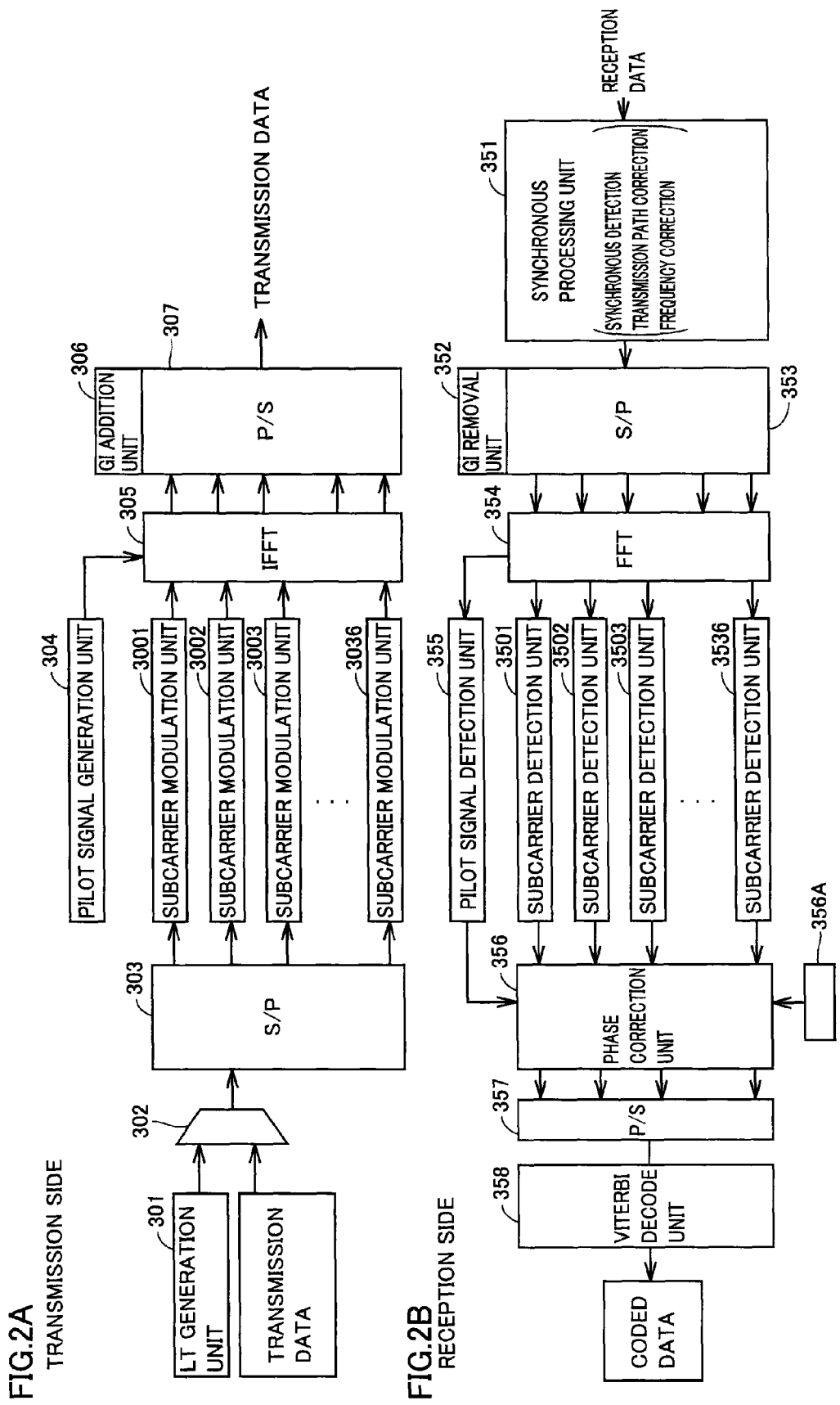
FIG. 2A represents a portion in a control MAC (Media Access Control) unit of FIG. 1, utilized when the transmission circuit transmits data.
FIG. 2B represents a portion of the control MAC unit, utilized when the transmission circuit receives data.

Referring to FIG. 2A corresponding to transmission, control MAC unit 300 includes, at the transmission side, a long training signal generation unit (designated as "LT generation unit" in FIG. 2A) 301, a data combining unit 302, a serial-parallel conversion unit (designated as "S/P" in FIG. 2A) 303, a pilot signal generation unit 304, an inverse Fourier transform unit (designated as "IFFT" in FIG. 2A) 305, a guard interval addition unit (designated as "GI ADDITION UNIT" in FIG. 2A) 306, a parallel-serial conversion unit (designated at "P/S" in FIG. 2A) 307, and subcarrier modulation units 3001-3036.

At the transmission side of control MAC unit 300, the data obtained from host system 100 and stored in program memory 254 ("TRANSMISSION DATA" in FIG. 2A) is combined, at data combining unit 302, with a long training signal generated at long training signal generation unit 301. In the radio communication system of the present embodiment, data is modulated under the multicarrier modulation scheme for transmission and reception. At control MAC unit 300 of terminal 1, long training signals and transmission data are arranged, as shown in FIG. 4, in the frame of each subcarrier.

Figure 4:
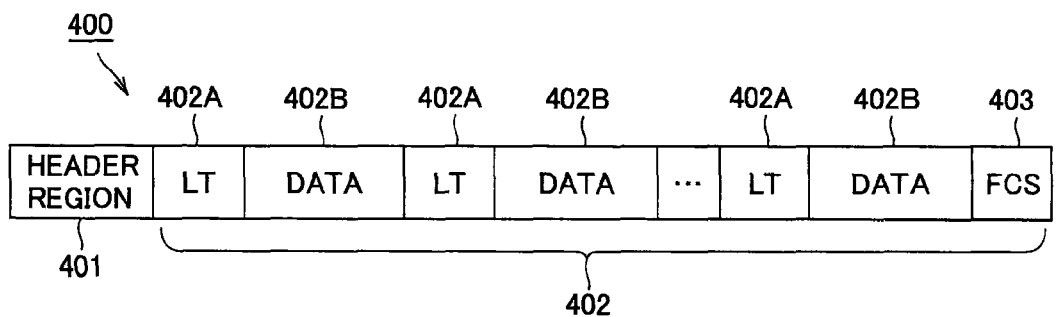
FIG. 4 is a diagram to describe how a long training signal generated at a long training signal generation unit of FIG. 2 is added to transmission data.

Referring to FIG. 4, the long training signal is represented as "LT" and transmission data is represented as "DATA". A frame 400 includes a header region 401, a frame body region 402, and an FCS 403. In frame body region 402, LT 402A and DATA 402B are arranged alternately. LT 402A is added for every DATA 402B corresponding to 32 symbols. In other words, each DATA 402B is identified as data of 32 symbols. A long training signal is added a plurality of times in frame 400.

The contents of data in the signal field of frame body region 402 are shown in Table 1.

TABLE 1

| Symbol | Signal |
|---|---|
| 3:0 | Reserved |
| 15:4 | Length Field |
| 23:16 | CRC8 |
| 29:24 | Tail Bits |

It is appreciated from Table 1 that data corresponding to the error correction of "CRC8" is included in the signal field. Error correction is carried out at a Viterbi decode unit 358 in the present embodiment, as will be described afterwards.

Referring to FIG. 2A again, serial-parallel conversion unit 303 divides the data combined at data combining unit 302 into 12. Serial-parallel conversion unit 303 repeats the twelve divided data three times for output to respective subcarrier modulation units 3001-3036. With regards to the three sets of the 12-divided data, serial-parallel conversion unit 303 provides the data divided into 12 and corresponding to the first set to each of subcarrier modulation units 3001-3012, the data divided into 12 and corresponding to another set to each of subcarrier modulation units 3013-3024, and the data divided into 12 and corresponding to the last set to subcarrier modulation units 3025-3036.

Subcarrier modulation units 3001-3036 carry out modulation for each subcarrier, and provide the modulated data to inverse Fourier transform unit 305.

At inverse Fourier transform unit 305, the subcarrier signal output from each of subcarrier modulation units 3001-3036 is subjected to inverse Fourier transform. Accordingly, the subcarrier signals output from subcarrier modulation units 3001-3036 are combined, and a multicarrier signal is generated. Inverse Fourier transform unit 305 combines a pilot signal generated by pilot signal generation unit 304 to the subcarrier signals output from subcarrier modulation units 3001-3036 to generate a multicarrier signal. The configuration of the generated multicarrier signal will be described here.

Figure 3:
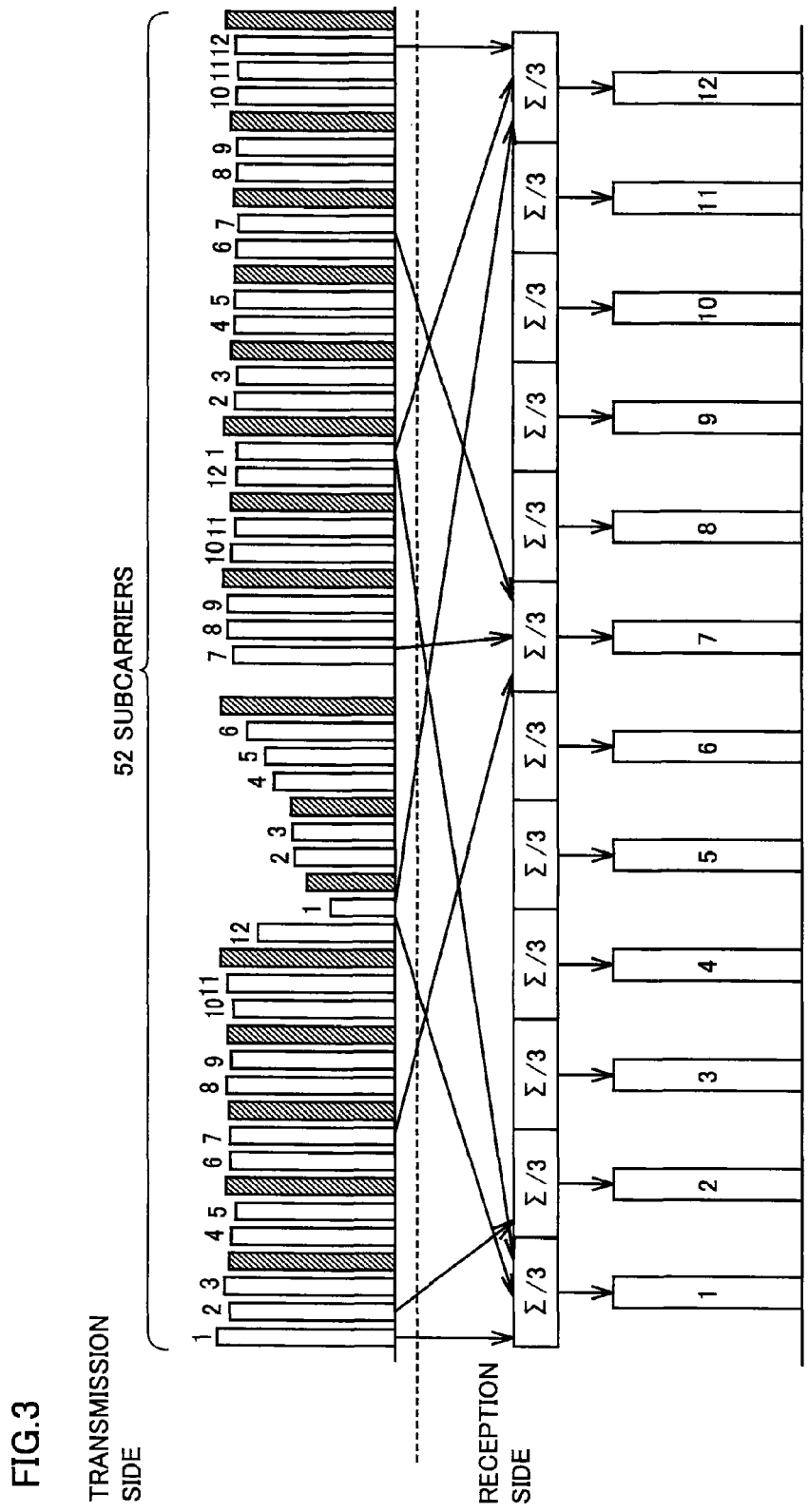
FIG. 3 is a diagram to describe how a multicarrier signal is handled in a radio communication network according to an embodiment of the present invention.

In FIG. 3 provided to describe how transmission data is handled at control MAC unit 300, the upper region corresponds to the transmission side and the lower region corresponds to the reception side.

At the transmission side of FIG. 3, 52 rectangles are indicated, including those having a numeric assigned at the top, and those in hatched representation. The rectangle with a numeric corresponds to any one of the twelve data divided at serial-parallel conversion unit 303. The numeric at the top represents which of the twelve divided data it corresponds to. The hatched rectangle corresponds to a pilot signal generated at pilot signal generation unit 304. The multicarrier signal generated in the present embodiment includes 16 pilot signals, among the 52 subcarriers. By the relatively large number of pilot signals included in the generated multicarrier signal of the present embodiment, phase error occurring in long-distance communication can be corrected more reliably at the terminal receiving the multicarrier signal.

With regards to subcarriers other than the subcarriers assigned to the 16 pilot signals among the 52 carriers indicated at the transmission side of FIG. 3, i.e. 36 subcarriers, the data divided into 12 at serial-parallel conversion unit 303 is respectively assigned to three subcarriers. Accordingly, data can be obtained by three subcarriers for each of the 12 divided data at the reception side. Therefore, data of higher reliability can be obtained by taking an average thereof, as will be described afterwards.

Although the number of repetition (the number of times of copy) of the divided data in the multicarrier signal is set to 3, the copy count is not limited to 3 in the radio communication system of the present invention. The number of times of copying should be determined in view of the trade off between the required communication efficiency of data and the required reliability in data transmission/reception, depending upon each circumstance of the radio communication system application.

Referring to FIG. 2A again, the multicarrier signal generated at inverse Fourier transform unit 305 is provided to a parallel-serial conversion unit 307. At parallel-serial conversion unit 307, a guard interval (a redundant signal) is inserted by guard interval addition unit 306. The insertion of a guard interval by parallel-serial conversion unit 307 will be described hereinafter with reference to FIG. 5.

Figure 5:
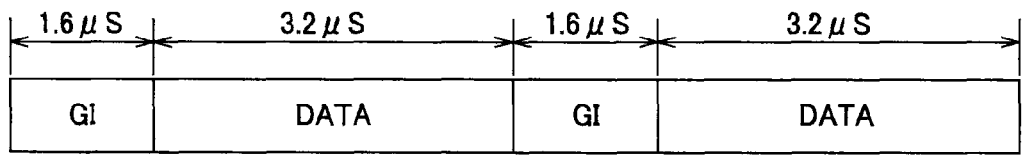
FIG. 5 is a diagram to describe how a guard interval is inserted to a multicarrier signal by a guard interval addition unit of FIG. 2A.

Referring to FIG. 5, an OFDM symbol is produced by inserting a guard interval to the multicarrier signal output from inverse Fourier transform unit 305. In the OFDM symbol, a guard interval of 1.6 µS and multicarrier signal data of 3.2 µS are present alternately. A guard interval is a redundant signal to avoid interference between codes during data transmission. The insertion of a guard interval allows the transmitted data to be protected from multipath fading.

By the relatively high ratio of the guard intervals inserted in the OFDM symbol to the data of the multicarrier signals in the present embodiment, transmission data can be protected from multipath fading more reliably in the radio communication system of the present embodiment.

Figure 6:
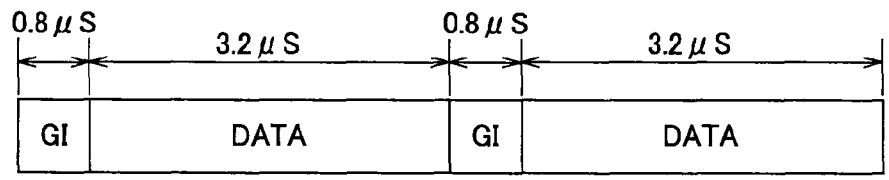
FIG. 6 is a diagram to describe the manner of insertion of a guard interval to a multicarrier signal in a general radio communication network.

FIG. 6 schematically represents an OFDM symbol that is transmitted and received in a general data communication. Referring to FIG. 6, the OFDM symbol that is generally transmitted/received has a guard interval of 0.8 µS and multicarrier signal data of 3.2 µS arranged alternately.

In the event of transmitting transmission data in the present embodiment, transmission data is combined with a long training signal at data combining unit 302, divided into 12 at serial-parallel conversion unit 303, copied three times and modulated at subcarrier modulation units 3001-3036, added with a pilot signal at inverse Fourier transform unit 305, inserted with a guard interval by guard interval addition unit 306 at parallel-serial conversion unit 307, resulting in an OFDM symbol. The generated OFDM symbol is transmitted onto the network via DAC 259, RF circuit 205, balun 204 and antenna 203.

The configuration of control MAC 300 in association with the reception side will be described hereinafter.

Referring to FIG. 2B, the data converted into digital data at ADC 258 (refer to FIG. 1) is applied to synchronous processing unit 351. At synchronous processing unit 351, detection of the beginning of a frame as well as the well-known synchronous processing such as symbol timing synchronization and carrier frequency synchronization are carried out. The processed data is provided to a serial-parallel conversion unit 353. At serial-parallel conversion unit 353, the data from synchronous processing unit 351 has the guard interval removed by a GI removal unit 352, and divided for every subcarrier to be provided to a Fourier transform unit (designated as "FFT" in FIG. 2B) 354.

At Fourier transform unit 354, the signals of the 52 received subcarriers other than those corresponding to the 16 pilot signals described with reference to the transmission side of FIG. 3 (i.e. 36 subcarriers) are provided to subcarrier detection units 3501-3536. Pilot signal detection unit 355 detects a pilot signal among the 52 subcarrier signals output to Fourier transform unit 354. Pilot signal detection unit 355 provides the detected pilot signal to a phase correction unit 356.

Phase correction unit 356 demodulates the 12 data (divided at serial-parallel conversion unit 303) based on the 36 subcarrier signals output from respective subcarrier detection units 3501-3536. The manner of demodulation will be described hereinafter with reference to the reception side of FIG. 3.

Referring to the reception side of FIG. 3, the data divided to 12 at serial-parallel conversion unit 303 is included three times each among the 36 subcarriers in the 52 subcarriers of the multicarrier signal at phase correction unit 356. At phase correction unit 356, an average of the data of the three subcarriers is obtained (calculated) for each of the 12 data, and demodulation is carried out based on the average. The pilot signal applied from pilot signal detection unit 355 is used for phase correction in this case.

Calculation of the average and data demodulation at phase correction unit 356 set forth above is under control of control unit 356A.

The 12 data demodulated at phase correction unit 356 are provided to parallel-serial conversion unit 357 to be combined.

The data combined at parallel-serial conversion unit 357 is provided to Viterbi decode unit 358 to be subjected to error correction by Viterbi decoding, and then output to shared memory 255 via external bus controller 253.

The present invention is advantageous in that the number of previous data referred to in error correction at Viterbi decode unit 358 can be set lower, for example to "40", lower than the number of data generally referred to (for example, "70"), by the measures taken in the present embodiment such as subcarrier-modulation with the same data repeated (three times each), including relatively many pilot signals, setting the ratio of inserted guard intervals relatively larger, and setting the number of added long training signals relatively larger.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A radio communication system comprising:
   a transmission terminal transmitting transmission data identified as data to be transmitted, and
   a reception terminal receiving data transmitted by said transmission terminal, wherein said transmission terminal includes:
   an output unit dividing transmission data for output,
   a modulation unit modulating the data output from said output unit to a plurality of subcarriers, and
   a conversion unit converting the data modulated by said modulation unit to a temporal waveform of a multicarrier signal,
   said modulation unit adding a long training signal to each subcarrier a plurality of times,
   wherein
   said conversion unit combines a pilot signal to the data modulated by said modulation unit to generate said multicarrier signal, and
   said output unit divides said transmission data and copies said divided transmission data a predetermined number of times for output to said modulation unit such that a number of the divided transmission data, subsequent to being copied said predetermined number of times, is equal to a value of the number of said plurality of subcarriers minus a number of pilot signals combined to one said multicarrier signal.

2. The radio communication system according to claim 1, wherein said modulation unit adds a long training signal for every predetermined symbol of each subcarrier.

3. The radio communication system according to claim 1, wherein said reception terminal includes
   a separation unit separating received data for every subcarrier,
   a demodulation unit demodulating data for every subcarrier separated by said separation unit,
   an average calculation unit calculating, for data of every subcarrier demodulated by said demodulation unit, an average of each set of data of a same copy original from the copy by said output unit, and
   an integration unit integrating averages for data of the same copy original from the copy by said output unit, calculated by said average calculation unit.

4. The radio communication system according to claim 3, wherein said reception terminal further includes an error correction unit carrying out error correction on the data integrated at said integration unit, based on a number of Viterbi reference data.

5. A radio communication system comprising:
   a transmission terminal transmitting transmission data identified as data to be transmitted, and
   a reception terminal receiving data transmitted by said transmission terminal, wherein said transmission terminal includes:
   an output unit dividing transmission data for output,
   a modulation unit modulating the data output from said output unit to a plurality of subcarriers, and
   a conversion unit converting the data modulated by said modulation unit to a temporal waveform of a multicarrier signal,
   said modulation unit adding a long training signal to each subcarrier a plurality of times
   an addition unit adding, for every predetermined time of a multicarrier signal converted by said conversion unit, a guard interval of a time half said predetermined time.

6. A transmission terminal transmitting transmission data identified as data to be transmitted, comprising:
   an output unit dividing transmission data for output,
   a modulation unit modulating the data output from said output unit to a plurality of subcarriers, and
   a conversion unit converting the data modulated by said modulation unit to a temporal waveform of a multicarrier signal,
   wherein
   said modulation unit adds a long training signal to each subcarrier a plurality of times,
   said conversion unit combines a pilot signal to the data modulated by said modulation unit to generate said multicarrier signal, and
   said output unit divides said transmission data and copies said divided transmission data a predetermined number of times for output to said modulation unit such that a number of the divided transmission data, subsequent to being copied said predetermined number of times, is equal to a value of the number of said plurality of subcarriers minus a number of pilot signals combined to one said multicarrier signal.

7. The transmission terminal according to claim 6, wherein said modulation unit adds a long training signal for every predetermined symbol of each subcarrier.

8. The transmission terminal according to claim 6, further comprising an addition unit adding, for every predetermined time of a multicarrier signal converted by said conversion unit, a guard interval of a time half said predetermined time.

* * * * *